US009683598B2

(12) United States Patent
Gusek et al.

(10) Patent No.: US 9,683,598 B2
(45) Date of Patent: Jun. 20, 2017

(54) DEVICE FOR REDUCING PRESSURE IN HOLLOW BODIES IN MEDIA AT HIGHER TEMPERATURES

(75) Inventors: Christopher Gusek, Iserlohn (DE); Frank Eisner, Chemnitz (DE); Joachim Huelstrung, Duesseldorf (DE); Fred Jindra, Lennestadt (DE); Bert-Heiner Willeke, Lennestadt (DE); Marc Blumenau, Hagen (DE); Markus Kovac, Bochum (DE); Gerd Jendrischik, Dinslaken (DE); Alfred Peitz, Oberhausen (DE); Rudolf Schoenenberg, Hemer (DE); Joerg Adler, Meissen (DE); Heike Heymer, Dresden (DE)

(73) Assignees: THYSSENKRUPP STEEL EUROPE AG, Duisburg (DE); FRAUNHOFER-GESELLSCHAFT ZUR FOEDERUNG DER ANGEWANDTEN FORSCHUNG E.V., Munich (DE)

( * ) Notice: Subject to any disclaimer, the term of this patent is extended or adjusted under 35 U.S.C. 154(b) by 442 days.

(21) Appl. No.: 14/130,855

(22) PCT Filed: Jun. 29, 2012

(86) PCT No.: PCT/EP2012/062729
§ 371 (c)(1),
(2), (4) Date: Aug. 5, 2014

(87) PCT Pub. No.: WO2013/007539
PCT Pub. Date: Jan. 17, 2013

(65) Prior Publication Data
US 2014/0341493 A1 Nov. 20, 2014

(30) Foreign Application Priority Data

Jul. 8, 2011 (DE) .................. 10 2011 078 878

(51) Int. Cl.
*F16C 13/02* (2006.01)
*C23C 2/00* (2006.01)
(Continued)

(52) U.S. Cl.
CPC .............. *F16C 13/02* (2013.01); *C23C 2/003* (2013.01); *F16C 13/00* (2013.01); *F16C 33/34* (2013.01)

(58) Field of Classification Search
None
See application file for complete search history.

(56) References Cited

U.S. PATENT DOCUMENTS 3,374,039 A * 3/1968 Voorhies ............. F16C 32/0618
384/114
3,484,232 A * 12/1969 Karinthi ................. B22D 1/005
75/528
(Continued)

FOREIGN PATENT DOCUMENTS

DE    43 07 282 C2    9/1993
DE    19 511 943 A1   10/1996
(Continued)

OTHER PUBLICATIONS

"Disc." Merriam-Webster.com. Merriam-Webster, n.d. Web. Oct. 14, 2016.*
(Continued)

*Primary Examiner* — Jacob Cigna
(74) *Attorney, Agent, or Firm* — Greenblum & Bernstein, P.L.C.

(57) ABSTRACT

The invention relates to the field of materials science and to a device for reducing pressure in cavities in media at higher temperatures, such as those devices which can be used for devices for hot-dip coating metal materials in the metal processing industry for example. The aim of the invention is
(Continued)

Figure 1:
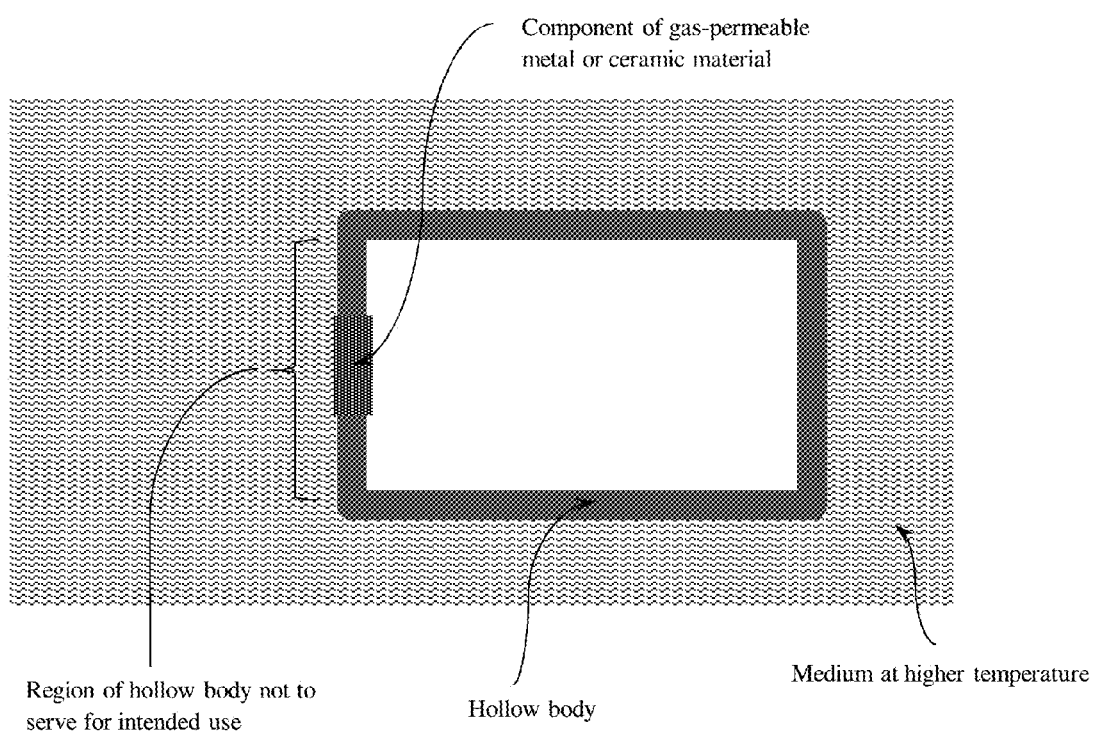

to provide a device by means of which pressure can be reduced in the cavity of the hollow bodies in a reliable and controlled manner and simultaneously the penetration of the media can be delayed or completely prevented at the higher temperatures. This is achieved by a device for reducing pressure in hollow bodies in media at higher temperatures, wherein at least one opening to the cavity of the hollow body is provided in hollow body regions which are not used for the intended application, said opening being closed from the medium surrounding the hollow body by at least one component made of a gas-permeable metal or ceramic material.

21 Claims, 2 Drawing Sheets

(51) Int. Cl.
*F16C 13/00* (2006.01)
*F16C 33/34* (2006.01)

(56) References Cited

U.S. PATENT DOCUMENTS

| | | | |
|---|---|---|---|
| 3,527,510 A * | 9/1970 | Christiansen | D01H 5/74 384/114 |
| 3,645,589 A | 2/1972 | Bird | |
| 3,645,590 A * | 2/1972 | Bird | F16C 32/0618 384/113 |
| 5,711,613 A * | 1/1998 | Ookouchi | C23C 2/003 384/283 |
| 6,692,689 B2 * | 2/2004 | Morando | C23C 2/00 118/423 |
| 7,175,711 B2 | 2/2007 | Platzer | |
| 2005/0141931 A1 * | 6/2005 | Domoto | G03G 15/2064 399/328 |
| 2007/0074657 A1 * | 4/2007 | Hamayoshi | C04B 35/593 118/424 |
| 2008/0274006 A1 * | 11/2008 | Bright | B23K 35/3053 420/17 |
| 2010/0192849 A1 | 8/2010 | de Kock et al. | |
| 2012/0003391 A1 * | 1/2012 | De Kock | C23C 2/003 427/431 |

FOREIGN PATENT DOCUMENTS

| | | |
|---|---|---|
| DE | 10 319 840 B3 | 6/2004 |
| DE | 10 2007 045 200 A1 | 4/2009 |
| DE | 10 2009 040 961 A1 | 3/2011 |
| EP | 1 518 003 B1 | 3/2005 |
| WO | WO 2006/ 002822 A1 | 1/2006 |

OTHER PUBLICATIONS

Douglas A. Weirauch Jr., "Technologically significant capillary phenomena in high-temperature materials processing Examples drawn from the aluminum industry," Solid State and Materials Science 9, 2005, pp. 230-240.

Kalazhokov et al., "Surface Tension of Pure Aluminum Melt," Technical Physics, 2003, pp. 272-273.

* cited by examiner

DEVICE FOR REDUCING PRESSURE IN HOLLOW BODIES IN MEDIA AT HIGHER TEMPERATURES

The disclosure relates to the fields of materials sciences and metallurgy and relates to a device for reducing pressure in hollow spaces in media at higher temperatures, as the device can be used for example for devices for the hot-dip coating of metal materials in the metal processing industry.

The hot-dip finishing of metal materials with a metal coating constitutes an established and known method of surface finishing to improve the use and corrosion properties of products. The metallic raw material to be coated is thereby briefly dipped into a metal coating bath. In the case of the hot-dip finishing of strand-shaped or flat products, such as wires or bands, a continuous process operation is available in which the product to be coated is guided through a coating bath for a few seconds. The continuous hot-dip finishing of flat steel products with a Zn-based or Al-based alloy coating is known as a case of application for this purpose. The constructive conditions of a hot-dip coating system of this type inevitably require a redirection and stabilization of the pass line of the flat product. This is usually realized by a roller arrangement that is sufficiently known (DE 19 511 943 A1; WO 2006/002 822 A1; EP 1 518 003 B1).

Due to the economic necessity of keeping the operating costs low, avoiding system downtime and guaranteeing high product quality, there are the demands to minimize overall wear and, in particular, that of the roller arrangement. The service life thereof is limited by the high mechanical and chemical wear in combination with the thermal loading during the continuous use in the metal coating bad. Resistance to rotation, mass moment of inertia and slipping tendency, which also influence wear and product quality, can thereby be significantly affected by the design of the roller arrangement.

According to the disclosure, hollow rollers have advantages over solid rollers or open rollers in this respect. However, the intended use of hollow rollers carries the risk of an excess pressure in the inner space. An excess pressure of this type results for example from the vaporization and the gas expansion of gases and/or liquid or moisture, which has intruded into the inner space during the production of the hollow roller, because of the high temperatures of the coating bath (~400° C.-800° C.). The volume expansion and the pressure buildup arise in the through-heating of the inner space during or after the dipping of the originally cold hollow roller into the molten material bath. An undesired deformation or, in the worst case, a bursting of the hollow roller can result therefrom. The latter not only considerably disrupts the operating flow, it rather also presents a definite danger to life for the system personnel: The excess pressure released suddenly and abruptly without prior warning can fling molten coating material out of the heating vessel.

The targeted dissipation of an excess pressure via ventilation devices becomes particularly difficult, since the intrusion of the coating bath into the inner space of the hollow roller is to be avoided. Thus, the use of hollow rollers is often omitted in favor of work safety.

However, in addition to the illustrated problem of the hollow rollers in hot-dip coating systems, there also exists the problem of the pressure reduction/pressure relief when using closed hollow bodies in an environment with higher temperatures, in particular with hot molten materials, as typical ventilation devices, e.g. valves or pipe feedthroughs, are expensive to produce and maintain.

The prior art discloses different solutions related to the ventilation of hollow rollers for the use in a metal coating bath.

According to DE 10 2007 045 200 A1, a hollow roller is known which is provided with a ventilation channel through the roller journal. The ventilation channel connects the inner space of the roller to a gas-filled space region in the journal bearing. This space region is furthermore connected to an atmospheric pressure above the coating bath surface via a second ventilation channel. The intrusion of molten metal into the ventilation space is prevented by the closed design of the roller bearing.

From WO 2006002822 A1 and DE 10 319 840 B3, designs are known in which the roller inner space is also connected to an expansion space in the roller bearing via ventilation channels. This expansion space can in turn be vented towards the ambient atmosphere via additional channels. Here, inductor coils are to prevent the intrusion of molten metal into the expansion space.

Gas transfer bores in journals and support arms of hollow rollers are known according to DE 43 07 282 C2. However, these bores are not further specified.

From DE 10 2009 040 961 A1, a possibility of sealing a ventilation bore in a hollow body using a wearing part is essentially known. However, the method described is not applicable for the hollow rollers immersed in a coating bath.

The operational experience for hot-dip coating systems has shown that the intrusion of molten coating bath into the journal bearing cannot be permanently avoided, which is associated with extended downtime and maintenance time. The constructional solutions according to DE 10 2007 045 200 A1 and DE 10 319 840 B3 can therefore be only inadequately sustained in everyday operation. In contrast, the simpler constructional solution according to DE 43 07 282 C2 does not effectively avoid the intrusion of the coating bath into the ventilation bore. If slag formation occurs there, a difficult-to-detect closure of the ventilation bore can result. This presents a considerable potential danger, as the use of a hollow roller can unknowingly occur that is capable of dissipating an excess pressure possibly occurring in the inner space in an uncontrolled manner. It is therefore strongly recommended to the system operator to refrain from the use of the suggested solution specified according to DE 43 07 282 C2.

In summary, all of the solutions known according to the prior art for ventilating hollow rollers or other hollow bodies for use at higher temperatures, and in particular in a metal coating bath, have significant deficiencies.

The continuous hot-dip finishing of long products is essentially faced with the challenge of extending the service life of the bath equipment and ensuring the product quality.

Figure 2:
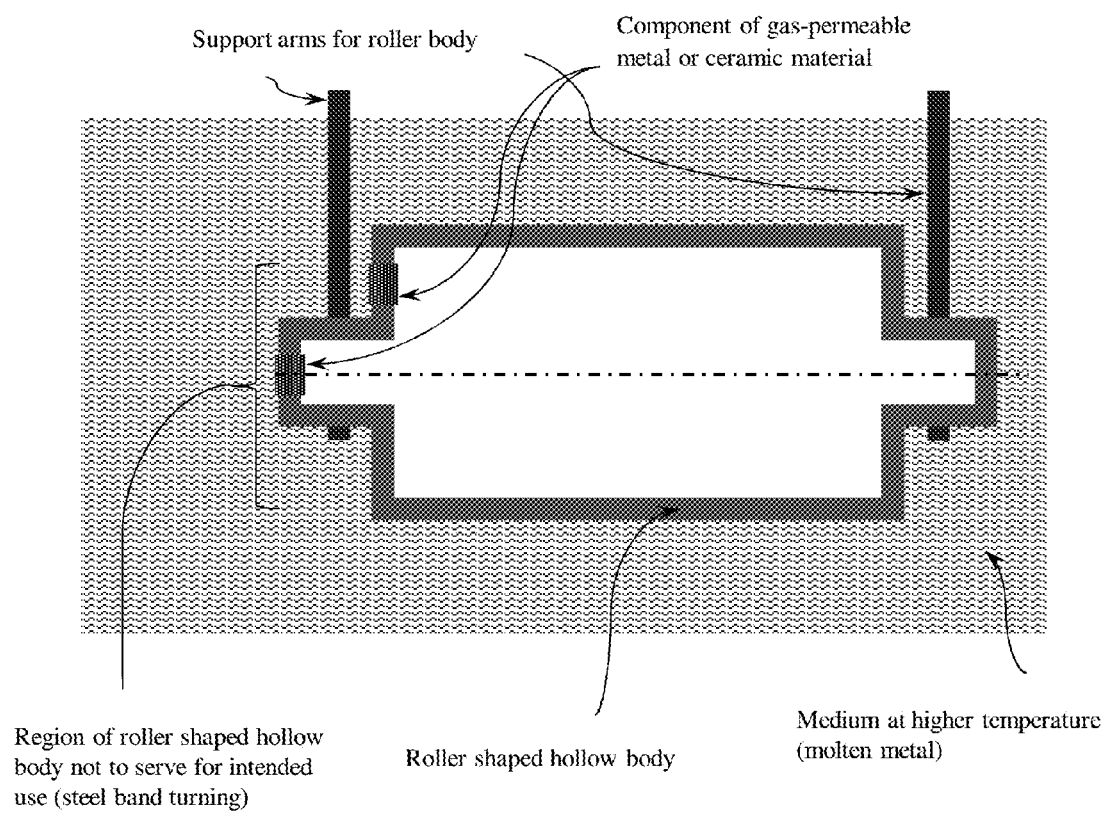

FIG. 1 shows a hollow roller having a component in accordance with aspects of the disclosure; and FIG. 2 shows a hollow roller with hollow journals having a plurality of components in accordance with aspects of the disclosure.

The aim of the disclosure is a device for reducing pressure in hollow bodies in media at higher temperatures, in particular in molten materials, by which a pressure reduction in the inner space of the hollow body can be realized in a safe and controlled manner and, at the same time, the intrusion of the media at the higher temperatures can be delayed or completely prevented.

The aim is attained by the invention disclosed in the claims. Advantageous embodiments are the subject matter of the dependent claims.

With the device according to the disclosure for reducing pressure in hollow bodies in media at higher temperatures, at least one opening to the hollow space of the hollow body is present in regions of the hollow bodies that do not serve the intended use, which opening is sealed against the surrounding medium of the hollow body by at least one component of a gas-permeable metal or ceramic material.

Advantageously, metal hollow bodies are present; more advantageously, rollers of hot-dip coating systems are present as metal hollow bodies.

Further advantageously, the hollow bodies are present in molten materials, liquids, and/or gases at temperatures at least above the melting point and/or softening point of the materials.

Also advantageously, the hollow bodies are present in molten materials of metals or metal alloys, glasses, or polymers.

And also advantageously, the component is arranged in side regions and/or bearing regions.

It is also advantageous if, in the case of roller-shaped hollow bodies, the component is arranged in the front faces and/or in the journals for bearing the roller-shaped hollow bodies, wherein the component is more advantageously arranged in the journals of the roller-shaped hollow bodies, the inner hollow space of which is connected to the hollow space of the roller-shaped hollow body.

It is also advantageous if the component is embodied as a disc.

It is further advantageous if multiple components are arranged in multiple openings, or if multiple components are arranged behind one another in an opening, wherein the individual components are more advantageously made of different materials in the case that multiple components are arranged behind one another in an opening.

And it is also advantageous if the component has patternings, advantageously local thickness decreases.

It is also advantageous if the component is made of a porous ceramic material, wherein porous ceramic materials or porous composite materials of different materials are more advantageously present as a ceramic material, and wherein oxide ceramics and silicate ceramics such as aluminum oxide, cordierite, steatite, magnesium oxide, zirconium oxide, zirconium silicate, aluminum titanate, or non-oxide ceramics such as silicon nitride, SiAlONs, aluminum nitride, silicone carbide, titanium carbide, titanium diboride, or carbon materials such as graphite or glassy carbon, or composites such as carbon-bound oxides or hard metals are more advantageously present as ceramic materials.

It is likewise advantageous if the component has a gas permeability within the range of $10^{-14}$ m$^2$ and $10^{-8}$ m$^2$, advantageously within the range of $10^{-13}$ to $10^{-10}$ m$^2$.

According to the invention, the device according to the invention is used as excess pressure protection or burst protection.

Advantageously, the use of the device as burst protection occurs for bursting pressures within the range of 0.5 to 2 MPa.

With the solution according to the invention, it initially becomes possible to realize a safe and controlled pressure reduction of hollow bodies in media at higher temperatures, in particular in molten materials. In particular, the work safety of systems with hollow bodies of this type is thus considerably improved.

At the same time, the intrusion of the media at higher temperatures, that is, of the molten materials in particular, into the inner space of the hollow bodies is delayed or completely prevented according to the invention.

According to the invention, media at higher temperatures are to refer to molten materials, heated liquids and/or heated gases or vapors.

Media within the scope of this invention are to refer to molten materials, liquids, or gases, wherein the solution according to the invention is to be used in particular for molten materials and, more precisely, for molten materials of metals or metal alloys, glasses, or polymers.

Accordingly, the higher temperatures for molten materials within the scope of this invention are to refer to temperatures at which the materials have been at least heated to above the melting point and/or softening point. The term "higher temperatures" is thereby placed in relation to the starting temperature of the hollow body before the hollow body is brought into contact with the medium. The medium has a higher temperature than the hollow body, whereby a temperature increase in the hollow body occurs as a result of the temperature equalization during the dipping of the hollow body into the medium, whereby a volume expansion of the gas inside the hollow body in turn occurs, which leads to the undesired inside pressure increase. In most cases, the hollow body will have an initial temperature of approx. −5° C. to 40° C., while the higher temperatures are normally over 80° C., in the case of molten metal between 350° C. and 800° C. or higher.

Surprisingly, the aim was able to be attained in that the hollow body was provided with a component according to the invention in the corresponding position. In these corresponding positions, which are located in regions of the hollow bodies that do not serve the intended use, openings are or will be introduced or present into which the component according to the invention is inserted.

Advantageously, the component according to the invention is embodied in the form of a disc and, more advantageously, a ceramic disc of a porous ceramic material that at least over a longer period of time exhibits no signs of corrosion and/or destruction under the media and the higher temperatures.

As shown in FIG. 1, in the case of a hollow roller in hot-dip coating systems, the regions that serve the intended use are to refer to the circumferential surfaces of the hollow roller, as the material to be coated comes into contact with the hollow roller there. The component according to the disclosure can be installed in all other positions of the hollow roller. Advantageously, as shown in FIG. 2, the component was installed into the hollow journal such that the ambient conditions of the hollow space of the hollow roller were present on the one side of the component and the molten material was present on the other side. It must thereby be considered that the component according to the disclosure should be installed in the hollow roller in a gas-tight manner at the edges so that the component according to the disclosure is not pressed out of the hollow journal during the gas penetration and, on the other hand, the molten material cannot intrude into the inner space of the hollow journal there. This can for example occur by means of carbon-containing sealing compounds. The component according to the disclosure made of a gas-permeable material thus seals the hollow space of the hollow body against the molten material. The gas-permeable material according to the disclosure is porous and thus permeable to gases that escape from the inner space and therefore lead to the pressure reduction and the pressure relief.

The porous material is thereby characterized by pore properties that simultaneously avoid an intrusion of the molten material through the material into the inner space of the hollow body and, in particular, of the hollow roller inner space.

This is achieved in that the wetting properties of the porous material are selected such that either an intrusion of the molten material does not or does not sufficiently occur as a result of a poor wetting, or such that even though an intrusion of the molten material into the porous material occurs, the molten material is retained there due to high capillary forces and does not intrude into the hollow body inner space. The intrusion is prevented if the capillary forces are higher than the so-called hydrostatic pressure from the molten material acting on the hollow space, which pressure is determined in the case of the hollow rollers of hot-dip coating systems by the dipping depth of the hollow roller in the molten material bath, the thickness of the molten material and the gravitational force.

The selection of the porous material can be easily made by a person skilled in the art in consideration of the wetting performance, the ambient conditions, in particular the surface tension of the molten material, and the pore characteristic (pore size) of the porous material according to the known so-called Washburn equation and by a coordination with the hydrostatic pressure occurring during use.

The capillary force of a porous material in contact with a molten material is described by the Washburn equation:

$$p_k = \frac{2\gamma}{r} \cdot \cos\phi$$

$p_k$=capillary pressure [Pa]
$\gamma$=surface tension [Jm$^{-2}$]
r=capillary radius [m]
$\phi$=wetting angle [°]

Both in the case of non-wetting and in the case of wetting of the porous material with a molten material, a penetration by gases from the inner space of the hollow body through the porous material into the molten material is ensured as soon as the gas pressure inside the hollow body becomes greater than the sum of the hydrostatic pressure of the molten material, the flow-through resistance of the porous material (estimate according to the Darci equation):

$$\Delta p = \frac{\eta}{k} \cdot d \cdot v \qquad (1)$$

$\Delta p$=pressure loss [Pa]
$\eta$=dynamic viscosity [Pa·s]
k=specific permeability [m$^2$]
d=material thickness [m]
v=velocity of flow [m·s$^{-1}$]

and, in the case of wettability, the capillary pressure. The penetration by the gases continues to take place until a pressure equilibrium is reached so that a dangerous pressure buildup inside the hollow body can be reliably prevented.

For the improvement of the safety function, it is also advantageous to design the component from gas-permeable, porous material as an excess pressure protection or bursting disc. This means that a marked deformation or destruction of the component of the porous material occurs when a particular pressure or pressure range is unexpectedly exceeded, whereby the region previously sealed by the porous component is partially or completely opened and the gas can escape into the environment or molten material under pressure reduction.

Although this leads to a destruction of the component according to the disclosure and possibly then to an intrusion of the molten material into the hollow body, it prevents larger and unpredictable damage as a result of a deformation or destruction of the hollow body itself for the purpose of a greatest possible work safety.

It is also advantageous that the direction, the quantity and the pressure of the gas escaping from the destroyed component is predictable and that further damage can be avoided or reduced by additional safety precautions.

The design of the additional safety function for a particular bursting pressure or bursting pressure range is easily possible by a person skilled in the art in consideration of the strength properties of the porous material, the geometry and the attachment of the gas-permeable, porous components. It is thereby also possible to provide one or more target rupture points by introducing specific cross-sectional changes in the component, which target rupture points allow a fracture or rupture of the porous preformed part in predetermined positions. A specific fragmenting of the component can thereby be achieved so that an unintended obstruction of the cross section opened after the bursting by separated pieces of the component is avoided.

By using a monitoring device, it can thereby be ensured that the burst event that has occurred is detected so that the hollow body can be removed from the molten material bath in sufficient time and the component can be replaced.

For the gas-permeable material, a material should be selected that withstands the operating conditions, that is, the temperature of the molten material and the corrosion thereof, as well as the acting mechanical forces.

According to the disclosure, all gas-permeable metal materials, gas-permeable ceramic materials or gas-permeable composite materials from different material classes can be used. Depending on the molten material, high-alloyed steels, stellites or generally high-temperature-resistant and corrosion-resistant materials, e.g. Ni-based materials, can be used as metal materials; as ceramic materials, for example, oxide ceramics and silicate ceramics such as aluminum oxide, cordierite, steatite, magnesium oxide, zirconium oxide, zirconium silicate, aluminum titanate, or non-oxide ceramics such as silicon nitride, SiAlONs, aluminum nitride, silicone carbide, titanium carbide, titanium diboride, or carbon materials such as e.g. graphite or glassy carbon, or composites such as e.g. carbon-bound oxides or hard metals can be used.

The specific permeability k is a property of the porous material and is essentially influenced by the pore size D and the pore volume $\epsilon$, as well as the tortuosity of the pore channels.

A simple estimate of k according to the Ergun equation (without tortuosity) yields:

$$k = \frac{\varepsilon^3}{150 \cdot (1-\varepsilon)^2} \cdot D^2 \qquad (3)$$

k=specific permeability [m$^2$]
$\epsilon$=porosity [–]
D=avg. pore diameter [m]

This equation gives a rough estimate; in the real material, the tortuosity, pore diameter distribution and, possibly, anisotropies can lead to deviations, so that measured values must be resorted to for the specific case.

Furthermore, materials with poorer corrosion resistance can be provided with protective layers that are more corrosion-resistant, wherein these protective layers can be applied both in the region of contact with the molten material and also on the inner surface of the pores. For a person skilled in the art, the selection of material from the pertinent experiences with applications at higher temperatures and, in particular, with resistant materials in molten material applications is easy.

Preferable for use in molten zinc materials and molten aluminum materials with a molten material temperature between 400° C. and 800° C. are above all corrosion-resistant ceramic materials that are also poorly wettable by the molten material, such as silicon nitride, SiAlONs, aluminum nitride, titanium diboride, but also aluminum oxide materials, silicon carbide materials or carbon materials.

Known methods and patterning methods can be used to realize the gas permeability and thus the porosity of the materials for the component. This includes for example the sintering of powders under preservation of the spaces between powder particles, the sintering of short fibers or long fibers, the use of placeholder materials, methods of casting from templates, foaming methods, etc.

The porosity must be the so-called open porosity, which permits the flow-through of gases. This is possible for uniformly distributed, isotropic pores from a total pore content of approx. >35%. However, sufficient flow-through capabilities can also already be achieved at lower pore contents with directional pore channels.

The size of the pores can be within the range of 1-1000 μm, wherein materials with pores within the range of 5 to 200 μm are preferably used. The porous materials usually have a particular pore-size distribution that is typically determined using the method of mercury porosimetry or permeability porometry. A tight pore-size distribution is thereby preferred which, based on known distribution functions of pore-size distribution (In distribution, RRSB distribution, GGS distribution), is described by a ratio value of $d90/d10 \geq 0.5$.

Furthermore, it is possible to use components with so-called asymmetrical or graded porosity or pore content and pore size. For example, a material with coarser porosity can be used as a carrier, to which a thin layer (membrane) of a fine porous layer has been applied. Or it is likewise possible to use two or more preformed parts of different materials (different both in terms of material and/or with respect to the pore properties) behind one another relative to the flow-through direction.

The gas-permeable porous material can be used as a component in different geometrical shapes. This includes for example straight or curved discs, cylinders, cylinders closed on one side (sleeves), frustums, or more complex shapes, such as cones. The selection depends on the arrangement of the gas-permeable material in the opening of the hollow body. A shape with a uniform wall thickness is preferred.

Furthermore, it is possible that multiple components are arranged in multiple openings in the hollow body. It is also possible according to the disclosure that multiple components are arranged behind one another inside an opening in the hollow body.

If multiple components are present in a hollow body, the materials of the individual components can thereby be different and, in particular with respect to bursting-pressure resistance, porosity and/or permeability, differently embodied.

A patterning of the components is also possible according to the disclosure such that local thickness decreases are for example present which can represent a target rupture point in a burst event. These thickness decreases can be equal to 5% of the thickness or more.

The determination of the flowed-through area depends on the expected additional gas volume that is typically produced during the heating of the hollow body, e.g. by dipping into the molten material bath or by a preheating step using expansion of the gas or of the substances contained in the hollow body or produced by temperature increase. This essentially depends on the hollow space volume of the hollow body, the temperature difference and the gas composition or substance composition. After selection of the gas-permeable material and determination of the specific permeability thereof, the required area and thickness of the preformed part can be easily calculated by a person skilled in the art using the known Darci equation, which area and thickness are necessary in order to achieve a sufficient gas penetration through the component and to reduce or limit the inner pressure in the hollow body accordingly. In each case, the required cross-sectional area of the component will be very small, that is for example <1% of the circumferential area of the hollow body, and the flowed-through thickness will only be a few mm to a few cm. In the case of hollow rollers in hot-dip systems, the installation can thus advantageously take place in one or both hollow journals or in the front face of the hollow roller, wherein the use of the component as a flat disc or cylindrical sleeve is preferred.

In the case of the simultaneous design of the preformed part as an excess pressure protection or bursting disc, it is also possible to use two or more components with different mechanical properties, different permeability, and/or different wetting performance. It can thus be achieved that only one component bursts during a particular pressure load, while one or more additional components in the ventilation device remain intact and prevent or slow the intrusion of the molten material following the destruction of the first disc. A material can thereby also be used which specifically reacts with the intruding molten material and slows or prevents penetration by the molten material.

For the installation of the component(s), it must be provided that a gas-tight device or restraint is used that also ensures a tightness against the intrusion by molten material.

In addition, it must provided that in a selection of porous materials with different thermal expansion coefficients compared to the material of the hollow body, no or only slight mechanical strains occur during temperature changes. For attaching, materially bonded connection techniques such as soldered connections, welded connections and adhesive connections can be used, or non-materially bonded connections such as clamped connections, shrink connections or bolted connections can be used, wherein additional sealing materials can also be used. In the case of the use of porous ceramic materials with low thermal expansion coefficients, planar clamped connections using elastic sealing materials are preferred. Here, sealing materials containing carbon, ceramic fiber or mica are for example preferred as sealing material.

It is thereby advantageous if the connection is releasable so that the preformed part of porous material and the sealing material can be easily replaced during an inspection or reworking, e.g. of the hollow rollers.

The solution according to the disclosure is distinct from the known prior art, in particular with respect to roller devices for hot-dip coating systems, in that:

no sealing of the journal against the coating bath is necessary;

additional openings that connect the hollow space in the journal to the ambient atmosphere can be foregone;

the intrusion of the coating bath into the hollow space of the journal can be effectively avoided;

a gas-permeable material, in particular a gas-permeable ceramic, is initially used as a component for sealing the opening in the rollers.

The solution according to the disclosure has the following essential advantages over the prior art:

A considerably simpler design principle with low wear. This results in a substantial increase in the service life of the bath equipment with a reduction of the maintenance cost.

The enabling of the safe use of hollow rollers in a metal coating bath. Optimal revolving properties can thus be enabled with a simultaneous marked increase in work safety.

The solution according to the disclosure is explained below in greater detail with the aid of an exemplary embodiment.

EXAMPLE

A hollow bottom roller for the hot-dip coating of steel band is dipped into a 680° C. molten aluminum bath. The cylindrical inner space in the roller has the dimensions of a 680 mm diameter and a 1670 mm length, which results in a volume of 0.606 m$^3$ that is filled with 20° C. air before use. During immersion of the roller in the molten material bath, the air is also heated to the bath temperature of 680° C. up to the stationary state, whereby a volume expansion of the air by 1,394 m$^3$ results. The roller is lowered into the molten material bath to a depth of 2.5 meters so that at a thickness of the aluminum of 2.38 g/cm$^3$, a hydrostatic pressure of 0.06 MPa acts on the roller.

A continuous cylindrical bore with a diameter of 40 mm is introduced in a journal of the roller for the bearing of the roller, which cylindrical bore connects the inner space of the roller to the outside environment. At a length of 30 mm, the cylindrical bore in the journal is widened to a cylindrical cavity with a diameter of 50 mm. A disc of porous ceramic with a diameter of 48 mm at a thickness of 5 mm is inserted into this cavity, which disc rests on both sides on a 4 mm-wide annular seal of 1 mm-thick graphite foil and is pressed on by a metal clamping ring. There thus results a 40 mm cross section of the porous ceramic disc that is free and able to be flowed through. After the immersion of the hollow roller, the molten material advances into the cylindrical bore of the journal up to the porous ceramic disc.

The ceramic disc is made of porous silicon-nitride ceramic with a total porosity of 51% at an average pore width of 12 μm, wherein the pore-size distribution is tightly embodied with a d90/d10 ratio of 3 (values calculated using mercury porosimetry). The specific permeability of this ceramic, calculated using permeability porometry, is 1.7× 10$^{-12}$ m$^2$. With a permeability of this type and the present geometry, the gas volume expanding inside the hollow roller is relieved within 600 seconds by outflow into the molten material, wherein according to the Darci equation a maximum counter-pressure of 0.18 MPa is briefly produced.

The wetting angle of silicon nitride with molten aluminum at 700° C. is 160° (D. A. Weirauch Jr., Technologically significant capillary phenomena in high-temperature materials Processing—Examples drawn from the aluminium industry, Current Opinion in Solid State & Material Science 9 (2005) 230-240); the surface tension of molten aluminum at 680° C. is 1.07 J/m$^2$ (Kh. Kh. Kalazhokov, Z. Kh. Kalazhokov, Kh. B. Khokonov, Surface Tension of Pure Aluminium Melt, Technical Physics Vol 48, No 2, 2003, 272-273). When the porous ceramic comes into contact with the 680° C.-hot molten aluminum, there results according to the Washburn equation a negative capillary pressure of −0.35 MPa, that is, the disc is not wetted and no penetration occurs even with the hydrostatic pressure of the molten material on the disc.

The bursting-pressure resistance of the disc is determined by pretests using an analogous restraint. This restraint is approximately 1.2 MPa, so that in the case of an unexpected pressure increase inside the roller, a rupturing of the disc and a pressure relief by outflow of the gas through the journal bore into the molten material are achieved.

The invention claimed is:

1. Device for reducing pressure in a hollow body arranged in media at relatively higher temperatures than an initial temperature of the hollow body, the device comprising the hollow body having a material support surface, and at least one opening to a hollow space in regions of the hollow body that are not the material support surface, and at least one component of a gas-permeable metal or ceramic material arranged in each of the at least one opening to seal the hollow space against a surrounding medium of the hollow body, wherein the at least one component is in contact with ambient conditions of the hollow space on one side of the component, and in contact with molten material of the surrounding medium on the other side of the component, wherein the hollow body is a roller of a hot-dip coating system.

2. Device according to claim 1, wherein the hollow body is a metal hollow body.

3. Device according to claim 1, wherein the hollow body is arranged in molten materials, liquids, and/or gases at temperatures at least above the melting point and/or softening point of the materials.

4. Device according to claim 1, wherein the hollow body is arranged in molten materials of metals or metal alloys, glasses, or polymers.

5. Device according to claim 1, wherein the at least one component is arranged in side regions and/or bearing regions of the hollow body.

6. Device according to claim 1, wherein the at least one component is embodied as a disc.

7. Device according to claim 1, wherein the hollow body comprises a roller-shaped hollow body having front faces and bearing journals, and the at least one component is arranged in the front faces and/or in the bearing journals of the roller-shaped hollow body.

8. Device according to claim 7, wherein the at least one component is arranged in the bearing journals of the roller-shaped hollow body, and wherein an inner hollow space of the bearing journals is connected to the hollow space of the roller-shaped hollow body.

9. Device according to claim 1, wherein the at least one component comprises multiple components, in which the multiple components are arranged in multiple openings of the hollow body, or the multiple components are arranged behind one another in a single opening.

10. Device according to claim 9, wherein the multiple components are arranged behind one another in an opening, and wherein individual components of the multiple components are made of different materials.

11. Device according to claim 1, wherein the at least one component has patternings.

12. Device according to claim 11, wherein the patternings comprise local thickness decreases.

13. Device according to claim 1, wherein the at least one component has a gas permeability within the range of 10-14 m² to 10-8 m².

14. Device according to claim 13, wherein the component has a gas permeability within the range of 10-13 to 10-10 m².

15. Method for operating the device according to claim 1, comprising:
arranging the device in the media; and
providing pressure protection or burst protection for the hollow body.

16. Method according to 15, wherein the burst protection for bursting pressures is within the range of 0.5 to 2 MPa.

17. Device according to claim 1, wherein the at least one component comprises a porous ceramic material.

18. Device according to claim 17, wherein the porous ceramic material comprises a plurality of porous ceramic materials or porous composite materials of different materials.

19. Device according to claim 18, wherein the ceramic materials comprise oxide ceramics and silicate ceramics, or non-oxide ceramics, or carbon materials, or composites.

20. Device according to claim 19, wherein the oxide ceramics and silicate ceramics comprise aluminum oxide, cordierite, steatite, magnesium oxide, zirconium oxide, zirconium silicate, aluminum titanate, wherein the non-oxide ceramics comprise silicon nitride, SiAlONs, aluminum nitride, silicon carbide, titanium carbide, titanium diboride, wherein the carbon materials comprise graphite or glassy carbon, and wherein the composites comprise carbon-bound oxides or hard metals.

21. Method for reducing pressure in a hollow body arranged in media at relatively higher temperatures than an initial temperature of the hollow body, the hollow body having a material support surface, and at least one opening to a hollow space in regions of the hollow body that are not the material support surface, the method comprising:
arranging at least one component of a gas-permeable metal or ceramic material in each of the at least one opening to seal the hollow space against a surrounding medium of the hollow body,
wherein the at least one component is in contact with ambient conditions of the hollow space on one side of the component, and in contact with molten material of the surrounding medium on the other side of the component,
wherein the hollow body is a roller of a hot-dip coating system.

* * * * *